US005491333A

United States Patent [19]
Skell et al.

[11] Patent Number: 5,491,333
[45] Date of Patent: Feb. 13, 1996

[54] DISPENSING METHOD AND APPARATUS THAT DETECTS THE PRESENCE AND SIZE OF A CUP AND PROVIDES AUTOMATIC FILL CONTROL

[75] Inventors: Daniel G. Skell; Eric D. Skell; Michael A. Manthei, all of Cedarburg, Wis.

[73] Assignee: Electro-Pro, Inc., Cedarburg, Wis.

[21] Appl. No.: 351,840

[22] Filed: Dec. 8, 1994

Related U.S. Application Data

[63] Continuation-in-part of Ser. No. 202,792, Feb. 28, 1994.

[51] Int. Cl.[6] .............................. G01V 8/20; G01S 7/481; G01S 17/02; B67D 3/00
[52] U.S. Cl. .................. 250/222.1; 250/559.31; 250/223 B; 222/641; 141/95
[58] Field of Search .............................. 250/223 B, 222.1, 250/223 R, 221, 559.31, 559.30, 559.29; 141/95, 198; 222/56, 640, 641, 644

[56] References Cited

U.S. PATENT DOCUMENTS

| 3,045,445 | 7/1962 | MacLeod . | |
|---|---|---|---|
| 3,367,128 | 2/1968 | Hosoda . | |
| 3,731,496 | 5/1973 | Frazier . | |
| 4,202,387 | 5/1980 | Upton . | |
| 4,437,499 | 3/1984 | Devale | 141/95 |
| 4,822,996 | 4/1989 | Lind . | |
| 4,890,774 | 1/1990 | Poore | 222/640 |
| 4,917,155 | 4/1990 | Koblasz et al. | 141/95 |
| 4,972,883 | 11/1990 | Hassell et al. | 141/95 |
| 5,002,102 | 3/1991 | Hösel . | |
| 5,036,892 | 8/1991 | Stenbridge et al. | 141/95 |
| 5,059,812 | 10/1991 | Huber . | |
| 5,159,834 | 11/1992 | Eisele . | |
| 5,164,606 | 11/1992 | Secord . | |

FOREIGN PATENT DOCUMENTS

| 2554244 | 5/1985 | France . |
|---|---|---|
| 2633081 | 12/1989 | France . |
| 4013743 | 11/1991 | Germany . |

OTHER PUBLICATIONS

Feinwerktechnik und Messtechnik, vol. 97, No. 6, 1 Jun. 1989 Munchen, DE, pp. 162–264.

Primary Examiner—Edward P. Westin
Assistant Examiner—John R. Lee
Attorney, Agent, or Firm—Andrus, Sceales, Starke & Sawall

[57] ABSTRACT

A dispensing method and apparatus is provided to detect the presence of a container and determine the relative size of the detected container and automatically dispense a product into the detected container while monitoring the fill level of the product in the container. Dispensing is automatically discontinued when the fill level nears the top of the container. The present system also provides a timed delay to allow settling of the dispensed product and thereafter dispenses to top-off the product in the container.

31 Claims, 11 Drawing Sheets

FIG. 6
SYSTEM FLOWCHART

DISPENSING METHOD AND APPARATUS THAT DETECTS THE PRESENCE AND SIZE OF A CUP AND PROVIDES AUTOMATIC FILL CONTROL

CROSS REFERENCE TO RELATED APPLICATIONS

This application is a continuation-in-part of pending U.S. application Ser. No. 08/202,792, filed Feb. 28, 1994.

BACKGROUND OF THE INVENTION

The invention relates to a method and apparatus for detecting the presence of a container, such as a cup, and differentiating between various container sizes. The invention dispenses a product in response to the cup detection and has an automatic fill control responsive to the size of the cup and the amount of product dispensed. An automatic top-off function is also provided.

The present invention evolved during continuing development of a hands-free method of dispensing beverages into containers and minimizing human contact to both avoid the spread of communicable diseases, and provide a labor saving method and apparatus for dispensing beverages. An additional benefit of the present invention is to provide a method and apparatus to minimize waste of the dispensed product by virtually ensuring that a cup will not be overfilled and that dispensing terminates immediately upon the start of cup removal.

Typically, beverage dispensing stations are actuated by a mechanical push rod or an electric push button switch to initiate dispensing. Such devices require human contact and therefore are capable of transmitting germs and communicable diseases. Further, it has become common in some restaurants to provide a beverage dispensing station accessible by the public for refills. In such cases, many people have access to the beverage station which increases the risk of spreading diseases and germs. It would therefore be advantageous and desirable to provide a dispensing station that is activated free of human contact and that does not require physical cup contact and therefore would prevent the spread of such diseases and germs.

For fast food restaurants commonly employ an individual dedicated to a beverage dispensing station during busy periods whose sole responsibility is to dispense beverages. Many common beverage dispensers require this employee to hold a cup against a mechanical push rod and hold it there until the cup is full. Therefore, even during slower periods, an employee must wait for each container to fill. It would be desirable in such circumstances to provide a method and apparatus to automatically detect the presence of a cup and differentiate the size of the cup and automatically dispense beverage into the detected cup until the cup is completely filled. Such a method and apparatus would free the dispensing station employee to perform other duties as well as operating the dispensing station.

SUMMARY OF THE INVENTION

The present invention solves the above mentioned problems by providing a dispensing method and apparatus to detect the presence of a cup or container and determine the relative size of the detected container. The invention automatically dispenses a beverage into the detected container while monitoring the fill level of the product in the container. Dispensing is automatically terminated when the fill level nears the top of the container. A time delay is provided to allow the dispensed product to settle and thereafter dispense product to top-off the container.

The present system uses the concept of triangulation position detection, which is the subject of the parent application, Ser, No. 08/202,792, to determine the presence and size of a container while using ultrasonic level detection to monitor the fill level of the product in the container.

The system uses an infrared transmitter and receiver pair for each container size desired to be detected and stacks the pairs vertically in a container dispensing station. Each transmitter and receiver pair is orientated in plane such that a transmission from a transmitter converges with a line of sight from the corresponding receiver at a target intercept point. A control circuit is provided to sequentially enable each of the transmitter and receiver pairs and monitor whether a signal transmitted by the transmitter is reflected off a container and sensed by the corresponding receiver. In this manner, the highest transmitter and receiver pair to sense a returned/reflected signal corresponds to the detected container size. The control circuit then activates a dispenser to dispense a product into the container according to the detected container size.

The invention further comprises an ultrasonic transceiver mounted adjacent the dispenser to monitor the fill level in the container as the dispenser dispenses product. The ultrasonic transceiver emits pulses of ultrasonic waves which are reflected off the dispensed product in the bottom of the cup and sensed by the ultrasonic transceiver. The control circuit monitors the time it takes an ultrasonic wave to be transmitted, reflected, and sensed, and converts this echo time to a fill level. When the fill level reaches a predetermined desired fill level for the particular cup size, the system automatically discontinues dispensing. Depending on the qualities of the dispensed product, an optional top-off cycle is also provided. For example, a carbonated beverage may produce enough foaming during dispensing that upon settlement, the fill level will be less than the predetermined desired fill level. The top-off cycle dispenses product to top-off the container after a predetermined delay time to allow the product to settle. The length of time the top-off cycle is activated is dependent upon the cup size and the fill level as monitored by the ultrasonic transceiver.

This system is therefore independent of how much ice is in the cup prior to dispensing or whether ice is even present in the cup at all. This is an additional benefit over systems that dispense predetermined amounts of beverage where ice is manually scooped into the cup prior to dispensing. If little or no ice is present in these prior systems, the cups will not be filled, and if too much ice is placed in the cup, the dispenser will overfill. The present invention controls the amount of beverage dispensed regardless of the ice content and consistently provides a full cup of beverage without overfilling.

Various other benefits, objects and advantages of the invention will be made apparent from the following detailed description taken together with the drawings.

DETAILED DESCRIPTION OF THE PREFERRED EMBODIMENT

Parent Invention

Figures 1, 2:
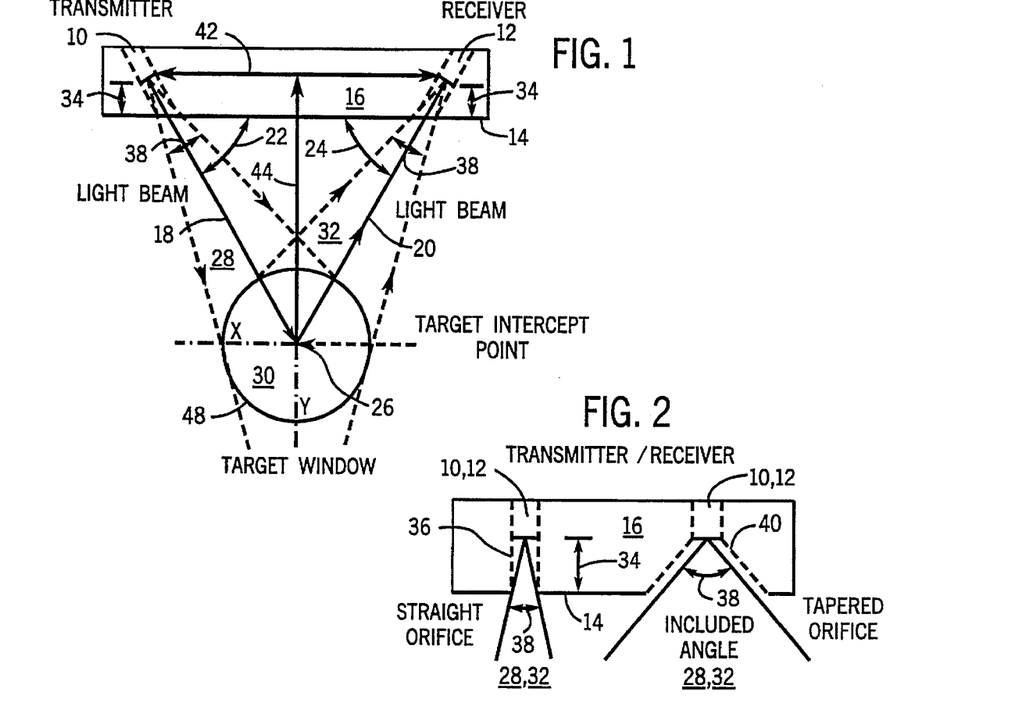
FIG. 1 is a schematic illustration in top plane view of a system in accordance with pending parent application Ser. No. 08/202,792.
FIG. 2 is a schematic in top plane view of various mounting arrangements for a portion of the system of FIG. 1.

Referring to FIG. 1, transmitter 10 and receiver 12 are mounted in plane 14 of mounting block 16. Transmitter 10 and receiver 12 are orientated in mounting block 16 such that an axis of projection 18 of transmitter 10 and an axis of reflection 20 of receiver 12 are 45° to plane 14 of mounting block 16 as shown by angles 22 and 24. Axes of projection and reflection 18 and 20 converge at target intercept point 26 which defines a point above which a dispensing spigot (not shown) is located to dispense beverages, ice, or any other type of dispensable product. Light beam 28 emitted from transmitter 10 has a cone-shaped radiation pattern which defines volumetric target window 30 such that when a container 48, for example a cup, glass, or other beverage holder, is placed within volumetric target window 30, at least a portion of light beam 28 is reflected toward receiver 12 as reflected light 32 having a cone-shaped sensing pattern.

FIG. 1 shows the general concept behind triangulation position detection wherein an object placed within volumetric target window 30 reflects at least a portion of the emitted light beam 28 from transmitter 10 toward receiver 12. The more an object occupies target window 30, the larger the portion of light beam 28 is reflected into receiver 12. This forms the basis for the triangulation theory of position detection. In other words, as an object begins to enter target window 30, only a small portion of light beam 28 is reflected off the object and toward receiver 12. The intensity of reflected light beam 32 increases as more of the object occupies target window 30. Preferably, when the leading edge of the object passes intercept point 26, the dispenser is activated by the intensity of reflected light beam 32.

Transmitter 10 and receiver 12 are recessed in mounting block 16 a recessed distance 34 for controlling the radiation pattern. As shown in FIG. 2, the preferred embodiment uses a straight orifice 36 which acts as a wave guide for narrowing light beam 28 emitted from transmitter 10 and reflected light 32 received by receiver 12. Recessed distance 34 controls the radiation pattern by varying included angle 38. Increasing recessed distance 34 by recessing transmitter 10 further inside mounting block 16 decreases included angle 38 which results in a smaller target window 30, FIG. 1. Reducing recessed distance 34, FIG. 2, by mounting transmitter 10 closer to plane 14 provides a larger included angle 38 which results in a larger target window 30, FIG. 1. Alternatively, tapered orifice 40 in mounting block 16 provides similar results by machining a taper in plane 14 of mounting block 16. A wider taper provides a larger included angle 38 and a larger target window 30, FIG. 1. A narrower taper 40, FIG. 2, provides a smaller included angle 38 and a smaller target window 30, FIG. 1. Straight orifice 36 is preferred because it is simply implemented by drilling a hole in mounting block 16, whereas tapered orifice 40 requires drilling a straight orifice for transmitter 10 and receiver 12, then machining the required taper corresponding to a desired target window 30, FIG. 1. Straight orifice 36 is also preferred because included angle 38 and the resulting target window size may be easily altered by simply adjusting recessed distance 34 of transmitter 10 and receiver 12. By testing the system with various containers, it was found that a preferred included angle 38 of 10° provided a target window 30, FIG. 1, which accommodates a majority of beverage cup sizes.

As previously described, the size of target window 30, FIG. 1, is generally dependent upon included angle 38, FIG. 2, and recessed distance 34; however, target intercept point 26 is defined by mounting angles 22 and 24 in combination with mounting distance 42 and since light beam 28, FIG. 1, is cone-shaped, varying target intercept point 26 has a corresponding effect on the size of target window 30. Mounting distance 42 is the distance transmitter 10 and receiver 12 are mounted apart from one another in mounting block 16. As can be seen in FIG. 1, holding mounting distance 42 constant and decreasing mounting angles 22 and 24 brings target intercept point 26 closer to mounting block 16 and decreases target intercept distance 44 which also decreases target window 30. Conversely, increasing mounting angles 22 and 24 increases target intercept distance 44, moving target intercept point 26 further away from mounting block 16 which also increases target window 30. Similarly, holding mounting angles 22 and 24 constant and increasing mounting distance 42 increases target intercept distance 44, moving target intercept point 26 further away from mounting block 16 which also increases target window 30. Conversely, decreasing mounting distance 42, decreases target intercept distance 44 bringing target intercept point 26 closer to mounting block 16 and also decreases target window 30. Target window 30 is centered about target intercept point 26 and moves correspondingly. In the preferred embodiment, a preferred mounting distance 42 of approximately 2.5" with a preferred mounting angle of 45° provided a desired target intercept distance of approximately 1.75". However, these figures are easily adjustable to acquire various target intercept distances, as previously described.

Figures 3, 4:
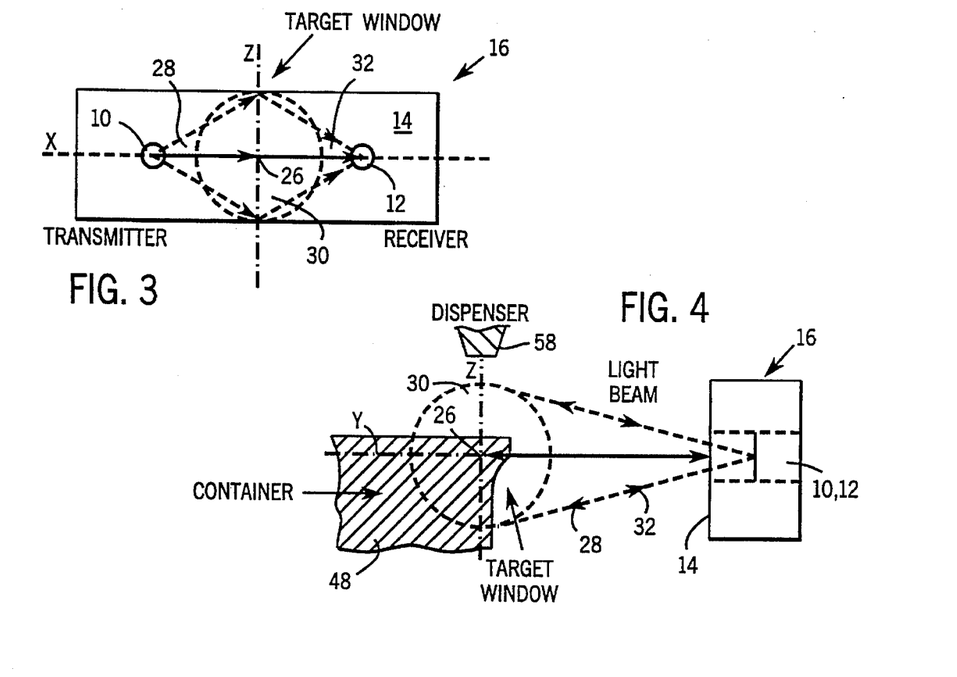
FIG. 3 is a horizontal plane view of the system of FIG. 1.
FIG. 4 is a side elevation view of the system of FIG. 1.

FIG. 3 shows a horizontal view of mounting block 16 in which transmitter 10 and receiver 12 are mounted in plane 14. While FIG. 1 shows target window 30 on a two-dimensional X–Y axis, FIGS. 3 and 4 show a third dimension of target window 30 on the Z axis. FIG. 4 shows a profile view of mounting block 16 in which light beam 28 is emitted from transmitter 10, reflected off container 48 in target window 30, and returned as reflected light beam 32 to receiver 12 in mounting block 16. When a sufficient portion of container 48 is within target window 30, the dispenser is activated to dispense product.

Figure 5:
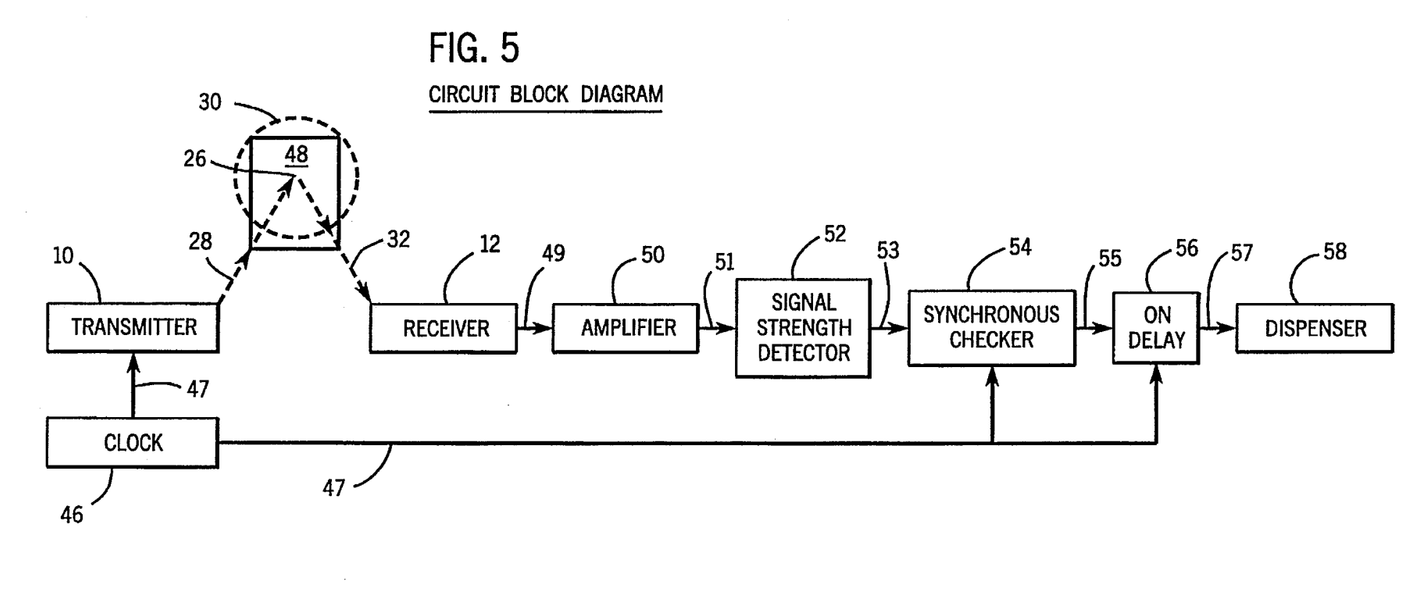
FIG. 5 is a circuit block diagram of a system in accordance with the parent invention of FIG. 1.

FIG. 5 shows a block diagram of the circuit used to implement the triangulation position detection device of FIG. 1. Clock 46 is connected to transmitter 10, synchronous checker 54 and ON delay 56. Transmitter 10 emits pulse light beam 28 in response to receiving a periodic clock pulse 47 from clock 46. Pulse light beam 28 is reflected off an object, for example a cup 48, as reflected light beam 32 toward receiver 12. Receiver 12 produces a light indicative signal 49 in response to receiving pulse light beam 32. Amplifier 50 is connected to receiver 12 and amplifies light indicative signal 49. Signal strength detector 52 receives the amplified light indicative signal 51 from amplifier 50 and compares amplified light indicative signal 51 against a predetermined parameter to detect whether a sufficient amount of light beam 32 was reflected to receiver 12. Signal strength detector 52 produces a signal strength signal 53 when the amplified light indicative signal 51 is greater than the predetermined parameter, and the synchronous checker 54 determines whether the signal strength signal 53 occurs substantially synchronously with the periodic clock pulse from clock 46. Synchronous checker 54 ensures that the light received in receiver 12 was indeed produced by transmitter 10 and produces a synchronous signal 55 in response. The synchronous signal 55 is received by ON delay 56 which is connected to clock 46 and dispenser 58, and delays activating dispenser 58 to ensure that container 48 has passed target intercept point 26 and occupies a majority of target window 30. In the preferred embodiment, it was found that a 100 millisecond delay was sufficient to ensure that the edge of cup 48 has passed target intercept point 26, which avoids spilling dispensed product over the leading edge of cup 48. ON delay 56 creates dispensing signal 57 to activate dispenser 58.

Figure 6:
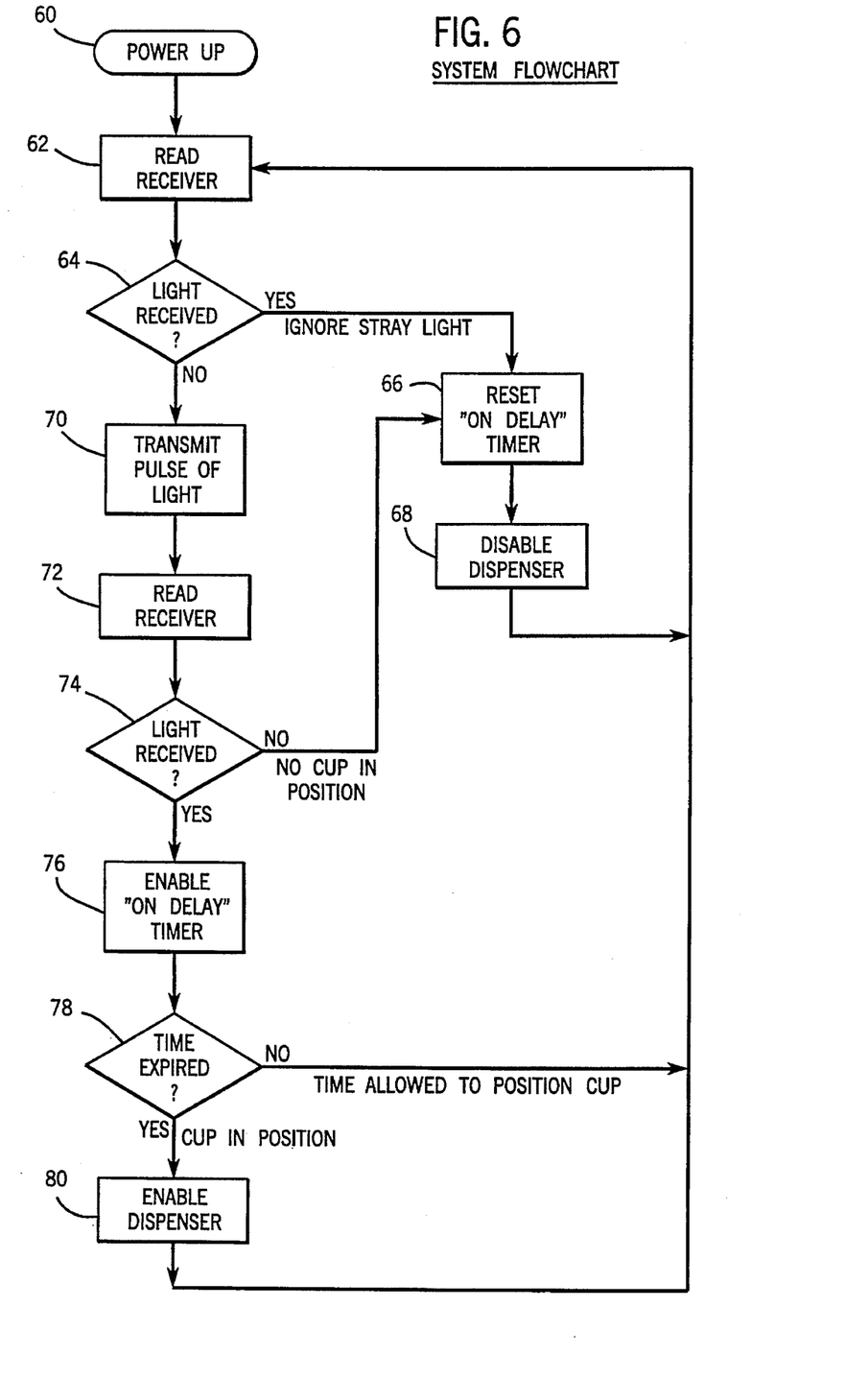
FIG. 6 is a system flow chart in accordance with the parent invention of FIG. 1.

FIG. 6 is a system flow chart of the triangulation position detection device which would guide implementing the device with a microprocessor and software. At power up 60 the receiver is read 62 and checked to see if light is received 64. If light is received, it is interpreted as stray light and ignored by the system by resetting the ON delay timer 66 and disabling the dispenser 68 to ensure the dispenser is deactivated. The system then reads the receiver 62 again, ensures that no stray light is received 64, and transmits a pulse of light 70. The receiver is read 72, and a determination is made as to whether a sufficient amount of light is received 74. An insufficient amount of light received is an indication that the cup is not yet in position or a stray light source was received. In those cases, the ON delay timer is reset 66, the dispenser is disabled 68, and the loop is restarted by reading receiver 62. If sufficient light is received 74, the ON delay timer is enabled 76. The loop is repeated until the desired delay time is expired 78 which allows enough time to position the cup sufficiently under the dispenser. When the delay time has expired 78, the cup is in position and the dispenser is enabled 80. The entire flow chart is repeated checking to make sure that the cup stays in position while dispensing. If the pulse of light is transmitted 70 but not sufficiently received 72, 74, the ON delay timer is reset 66 and the dispenser is immediately disabled 68 which provides an instant OFF when the cup is no longer sufficiently in target window 30, FIG. 1.

Figure 7:
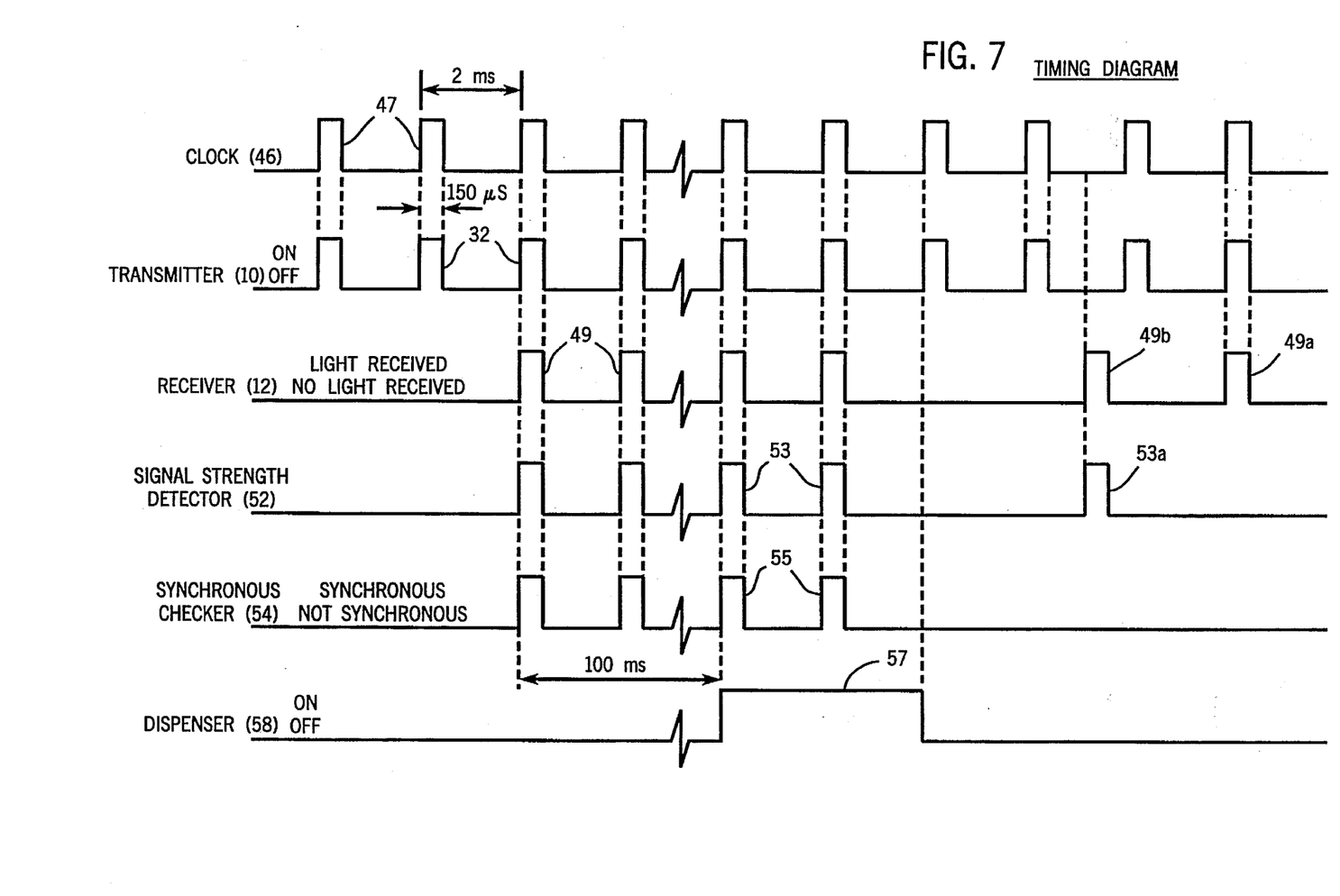
FIG. 7 is a timing diagram of a system in accordance with the parent invention of FIG. 1.

FIG. 7 shows a timing diagram with various examples of operation. Clock (46) produces periodic clock pulses 47 having a period of 2 ms. and a pulse width of 150 μs. Clock (46) enables transmitter (10) which provides a pulse of light 32 with the same periodicity as clock pulses 47. Transmitter (10) has a time of emission equal to the clock pulse width. The transmitter produces a pulse of light 32 substantially equal in time to the clock pulse 47 produced by the clock. Receiver (12) produces light indicative signals 49 when light is received. Signal strength detector (52) shows signal strength signals 53 coinciding with light indicative signals 49 only when light indicative signals 49 are greater than a predetermined parameter. For example, light indicative signal 49a is not greater than the predetermined parameter and therefore no corresponding signal strength signal 53 is shown. Light indicative signal 49a may indicate a stray or errant light source. Synchronous checker 54 has synchronous signals 55 only when the signal strength signals 53 are substantially synchronous with the periodic clock pulses 47. For example, signal strength signal 53a corresponding to light indicative signal 49b is not synchronous with any clock pulse 47 and therefore does not have a corresponding synchronous signal. Dispenser (58) receives dispensing signal 57 which is delayed 100 ms. from the first occurrence of a synchronous signal 55. Dispensing signal 57 has an ON pulse width dependent upon the reoccurrence of synchronous signals 55. ON delay 56, FIG. 5, holds dispenser 58 in the enable mode until a clock pulse 47, FIG. 7, occurs in the absence of a synchronous signal 55, at which point dispensing pulse 57 goes low disabling dispenser (58).

This method and device is not limited to any particular light source but is functional with any electromagnetic radiation in the optical wavelength range including infrared, visible, and ultraviolet. The preferred embodiment uses an infrared transmitter and receiver because they are very reliable, readily available, long lasting, and relatively inexpensive.

Present Invention

Figure 8:
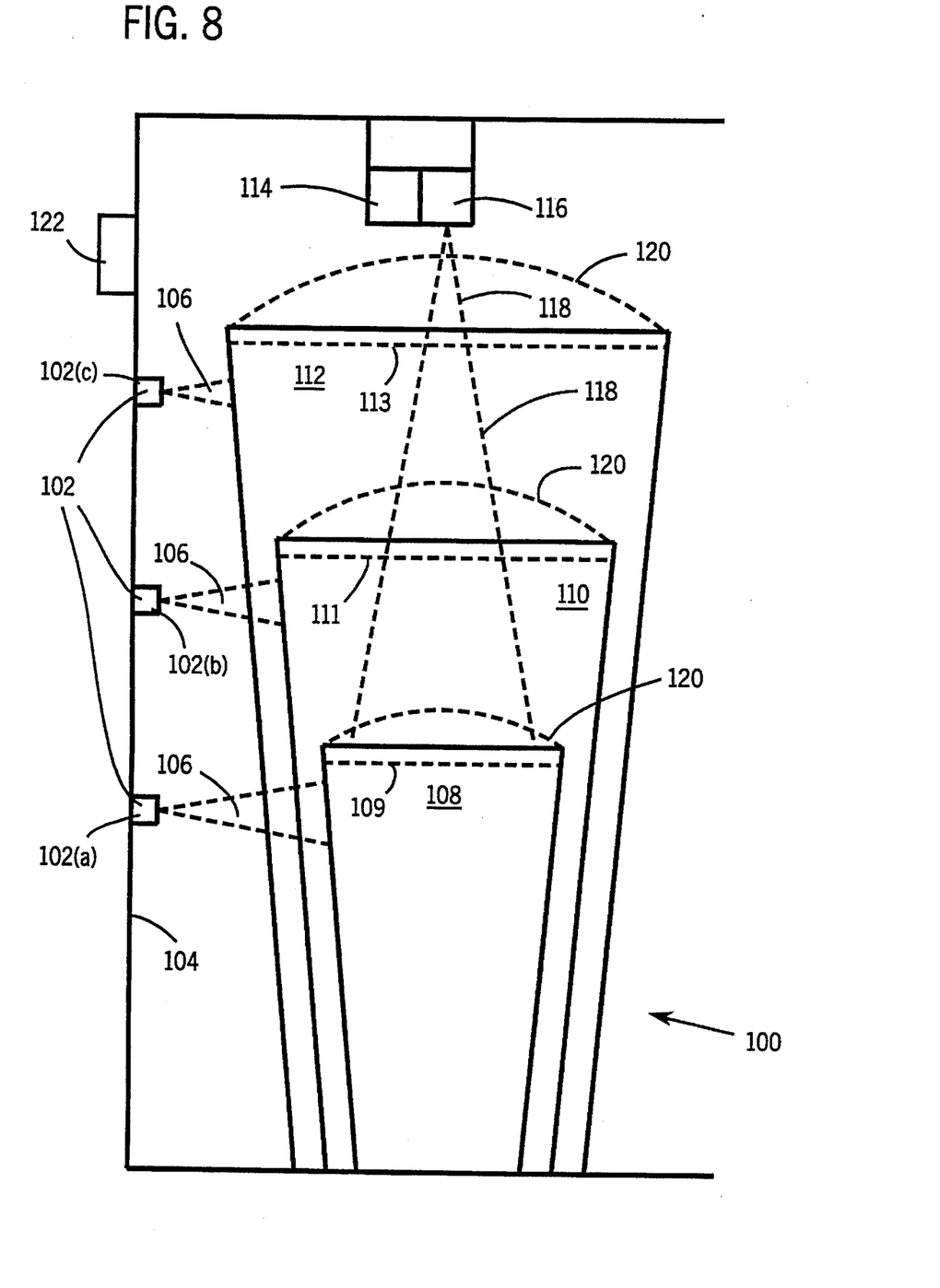
FIG. 8 is a schematic illustration in side plane view of a system in accordance with the present invention.

The present invention expands on the technology developed in the parent invention to not only detect the presence of a container, but also to determine the relative size of the container and automatically dispense a product according to the detected container size. Referring to FIG. 8, a cup station 100 has a plurality of transmitter and receiver pairs 102 orientated on a plane 104 such that a transmission 106 from a selected transmitter converges with a line of sight from a corresponding receiver, as shown and described with reference to FIG. 1, at a target intercept point 26, FIG. 1. Transmitter and receiver pairs 102, FIG. 8, are stacked vertically such that each transmitter and receiver pair corresponds to a particular container size. The number of transmitter and receiver pairs 102 corresponds to the number of desired cup sizes to be differentiated. For example, for illustrative purposes, FIG. 8 has three transmitter and receiver pairs 102 for three different cup sizes—a small size container 108, a medium size container 110, and a large size container 112. Each of the cup sizes also has a predetermined desired fill level 109, 111, and 113, respectively. However, it is readily apparent that if it is desirable to detect additional container sizes, corresponding additional transmitter and receiver pairs can be added to accommodate as many different cup sizes as is desired. Conversely, the present invention can be adapted with as few as two transmitter and receiver pairs to differentiate between two different size containers.

A dispenser 114 is located above cup station 100 to dispense a product into containers 108, 110, or 112. An ultrasonic transceiver 116 is mounted adjacent to dispenser 114 such that an ultrasonic signal 118 is emitted by the ultrasonic transceiver 116 and reflected by a product dispensed into container 108, 110 or 112. A reflected signal 120 is then detected by the ultrasonic transceiver 116. A control circuit 122 is connected to each of the transmitter and receiver pairs 102, the ultrasonic transceiver 116, and the dispenser 114.

Functionally, as is later described in more detail, control circuit 122 periodically and sequentially enables each of the transmitter and receiver pairs 102 such that a transmission 106 is reflected and sensed by the transmitter and receiver pair 102 when a container is substantially in a target window as described in the parent invention. For example, for a medium size container 110 placed in cup station 100, a first, lower transmitter and receiver pair 102(*a*) will sense the presence of medium container 110, then control circuit 122 will enable a next, higher transmitter and receiver pair 102(*b*) which also will sense the presence of medium size container 110. Control circuit 122 then enables yet a higher transmitter and receiver pair 102(*c*) which will not sense the presence of medium size container 110. As a result, control circuit 122 activates dispenser 114 to dispense a product into a medium size container and activates ultrasonic transceiver 116 to emit a series of short ultrasonic pulses into medium size container 110 and monitor reflected ultrasonic signals 120. Control circuit 122 monitors the echo time from a transmission of an ultrasonic pulse to the time of a reception and converts that echo time to a product fill level in container 110.

Control circuit 122 continues to monitor the transmitter and receiver pairs 102 to ensure the continued presence of medium size container 110 and continues dispensing until the product reaches predetermined desired fill level 111 at which time dispensing is terminated and a delay timer in control circuit 122 allows the dispensed product to settle in container 110. After the delay cycle terminates, control circuit 122 reactivates dispenser 114 to top-off the dispensed product such that the product fill level reaches the predetermined desired fill level 111. As a result, the container is considered full without any waste associated with overfilling.

Optionally, ultrasonic transceiver 116 may be moved, for example, left or right in FIG. 8, such that ultrasonic signal 118 senses an edge of containers 108, 110 and 112. In this manner, the ultrasonic transceiver can be monitored to detect and determine container height by measuring the time a reflected ultrasonic signal is returned, or the relative strength of such a signal may be used to establish or verify container height.

Figure 9:
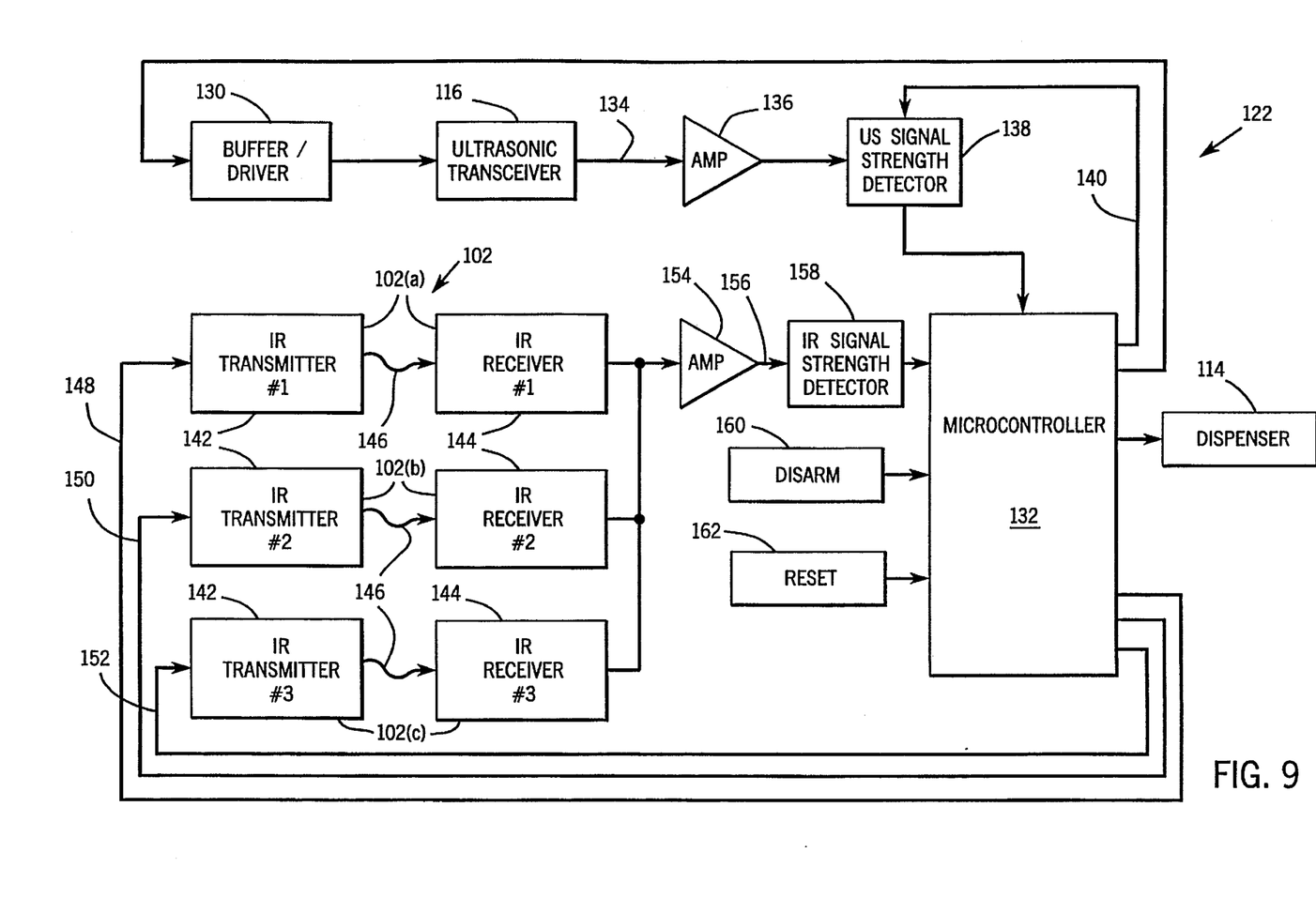
FIG. 9 is a circuit block diagram of a system in accordance with the present invention of FIG. 8.

FIG. 9 shows a block diagram of control circuit 122, transmitter and receiver pairs 102, and transceiver 116 of FIG. 8. The level control portion of the circuit has ultrasonic transceiver 116 driven by buffer/driver 130 which is activated by a microprocessor, or more specifically a microcontroller 132, which in the preferred embodiment is a Microchip PIC 16C56. Ultrasonic transceiver 116 emits pulses of ultrasonic wave signals and produces level detection signal 134 in response to detecting a reflected ultrasonic wave signal. Amplifier 136 amplifies the level detection signal and is connected to level detector 138 which compares the amplified level detection signal to a predetermined threshold. Level detector 138 has a blanking input 140 from microcontroller 132 to disable level detector 138 during the transmission of an ultrasonic signal to avoid detecting an echo during the ultrasonic transmission.

Transmitter and receiver pairs 102 are connected in parallel and each comprise a transmitter 142 and a receiver 144. Transmitters 142 emit pulses of infrared radiation 146, which when reflected from a container as previously described, are sensed by receiver 144. Transmitters 142 are sequentially enabled by micro-controller 132 by parallel IR inputs 148, 150, and 152 corresponding to transmitter and receiver pairs 102(*a*), 102(*b*), and 102(*c*), respectively. Receivers 144 are connected in series to amplifier 154 which supplies an amplified received signal 156 to signal strength detector 158. Signal strength detector 158 ensures that any received signal is greater than a predetermined parameter to not only ensure that a container is in position, but also to eliminate error signals produced by stray light sources. Signal strength detector 158 is connected to microcontroller 132 which is also connected to a disarm circuit 160 to manually turn the system OFF for cleaning the cup station. A reset circuit 162 holds microcontroller 132 in a reset mode for a predetermined time during power up.

Microcontroller 132 is connected to dispenser 114 to activate dispensing after a container has been detected and its size determined. Dispensing is terminated when the level of dispensed product nears the top of the container as previously described and determined according to the following algorithm implemented by microcontroller 132.

Figure 10A:
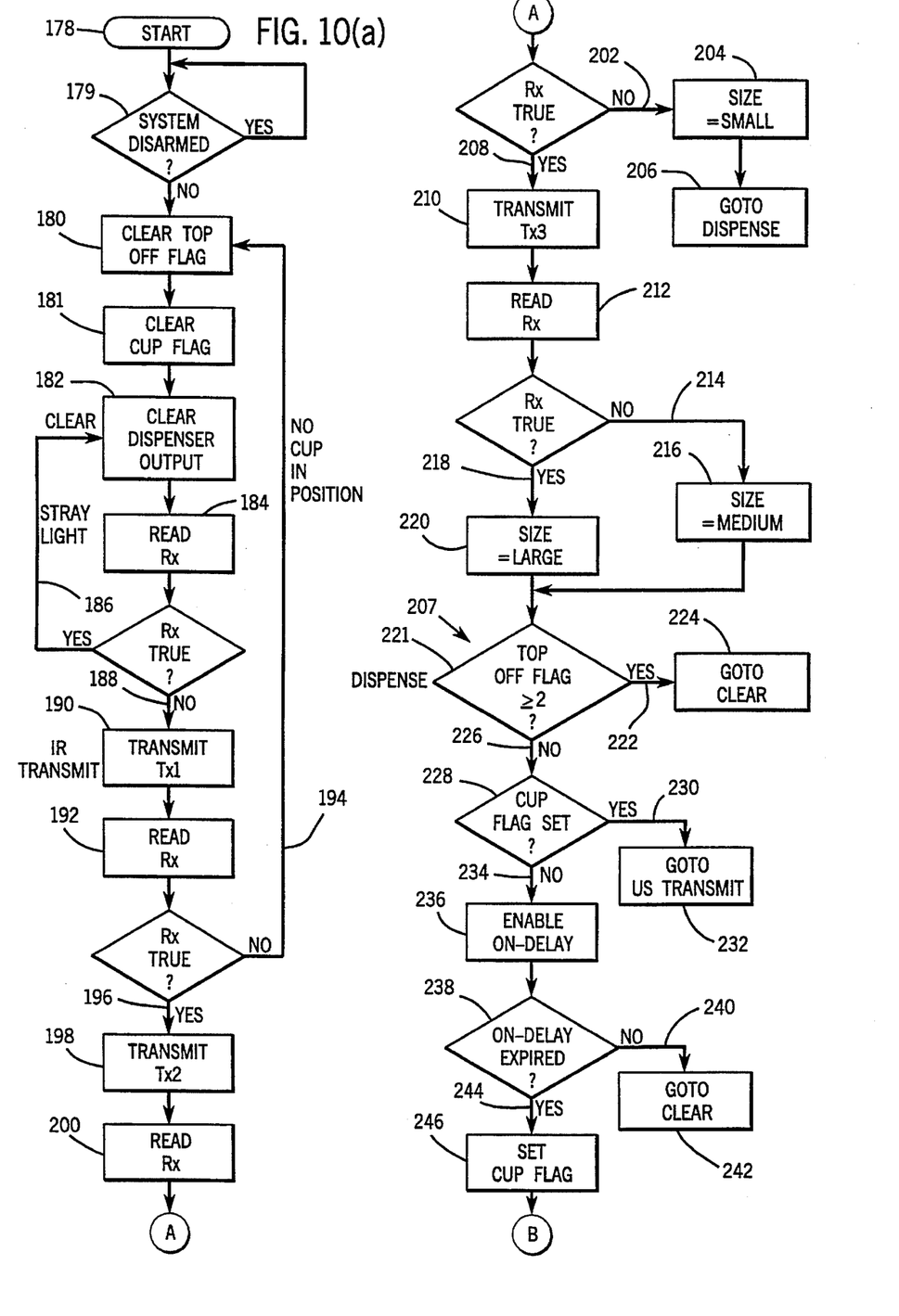
FIGS. 10(a)–(b) is a system flow chart in accordance with the present invention of FIG. 8.
Figure 10B:
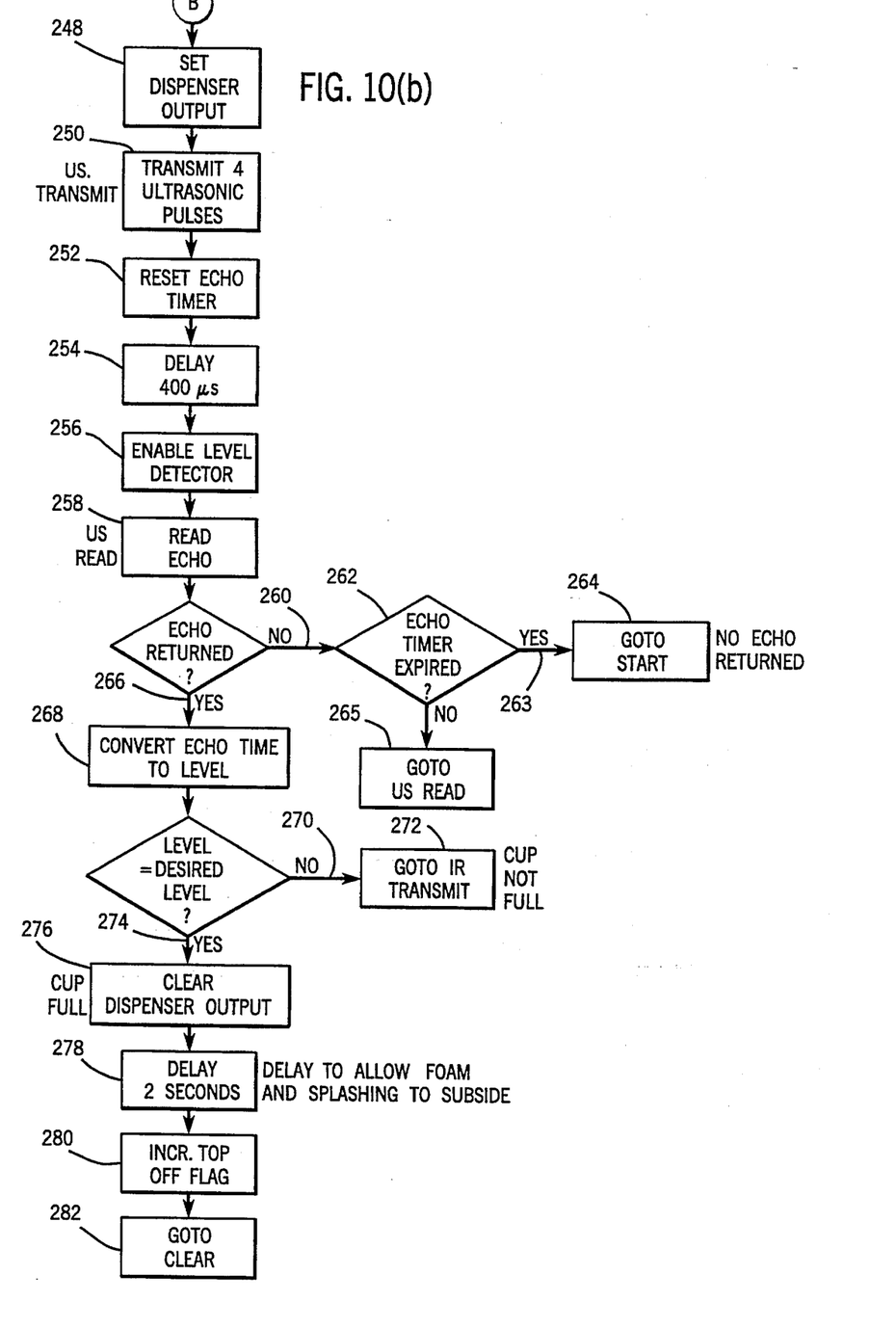

FIGS. 10(*a*)–(*b*) disclose the algorithm of the microcontroller in flow chart form. Upon power up 178, the system disarm is checked 179 and loops until it is no longer disarmed at such time a top-off flag, a cup flag, and the dispenser output are cleared 180, 181, and 182, respectively. The top-off flag indicates whether the dispense control is in a dispense mode, or a top-off mode, or in a cup full mode. The top-off mode occurs after the dispense mode has filled the cup and completes dispensing after allowing the dispensed product to stabilize. The system disarm 179 may also include a timer to ignore the disarm after a predetermined time for cleaning or to bypass the disarm.

To determine whether a cup is in position, the receiver is first read 184 without any transmission from the transmitter, and if the receiver senses a signal 186, it is determined to be from a stray light source and the cycle reiterates until the stray signal has passed. When no stray signal is encountered 188, the first transmitter is enabled 190 and the receiver is read 192. If no signal is received by the receiver 194, there is no cup in position and the algorithm starts over again at 180. When the receiver senses a return signal from the first transmitter 196, the second transmitter is enabled 198 and the receiver is read 200. If no signal is received 202, the size of the detected cup is determined to be small 204 and the algorithm goes to dispense 206 at 207. If after transmitting from the second transmitter, the receiver senses a larger cup in position 208, the third transmitter is enabled 210 and the receiver is read 212. If the receiver does not sense a reflected signal from the third transmitter 214, the size of the detected cup is determined to be a medium size 216 and the system goes to dispense 207. If, on the other hand, the receiver senses a reflected signal after the third transmitter transmits 218, the size of the container detected is determined to be a large size 220 and the system goes to dispense 207.

After determining the cup size, the top-off flag is checked 221, and if the top-off flag is greater or equal to two 222 the system goes to clear 224 at 182. The top-off flag determines the mode the dispenser is in according to the following table:

| TOP-OFF FLAG | MODE |
| --- | --- |
| = 0 | Dispense mode |
| = 1 | Top-off mode |
| = 2 | Cup full |

If the top-off flag is zero or one 226, the cup flag is checked 228, and if it is set 230, the system is programmed to go directly to the ultrasonic transmit 232 at 250, FIG. 10(*b*). If the cup flag is not set 234, FIG. 10(*a*), the ON delay is enabled 236 and checked to see if it has expired 238. The ON delay provides a brief delay between cup detection and dispensing to ensure the cup is adequately positioned under the dispenser. In the preferred embodiment the ON delay is set at 100 ms. During the delay cycle 240 the system goes to clear 242 at 182 to ensure that the dispenser is OFF and the cup remains in place. After the ON delay expires 244 the cup flag is set 246 indicating that a cup is adequately positioned and the dispenser output is activated 248, FIG. 10(b).

After the system begins to dispense, four ultrasonic pulses are transmitted into the cup 250 and an echo timer is set 252. The system has a 400 μs delay 254 prior to reading to avoid sensing rings, which are errant echoes caused by the ultrasonic transmission 250. The level detector is enabled 256 after the delay 254 and the system monitors for an echo 258. If no echo is returned 260, the echo timer is checked to see if it has expired 262 and if not, the system continues to read for an echo 265 at 258. If the echo timer expires without an echo returned 263, the system is reset 264 at 178. If, on the other hand, an echo is returned 266, the echo time is converted to a dispensed product level 268 and if the level is not the desired level for that particular cup 270, the system returns to the infrared transmit 272 at 190 since the cup is not full. However, once the level equals the desired level 274, the dispenser output is deactivated or terminated 276 and a delay is initiated for a predetermined time 278 to allow the product to stabilize. For example, a two second delay is sufficient to allow the foam and splashing common in dispensing moderately carbonated beverages to subside.

After the two second delay, the top-off flag is incremented 280 and the system goes to clear 282 at 182. At this point, the top-off flag equals one and the system goes into the top-off mode wherein the algorithm reiterates to automatically refill the cup to the appropriate predetermined desired fill level, 109, 111, or 113, FIG. 8. After the level reaches the appropriate predetermined desired fill level 274, FIG. 10(b), the top-off flag is again incremented 280 wherein the top-off flag now equals two and the system goes to clear 282 at 182, FIG. 10(a). Now that the top-off flag is two, the algorithm loops between the clear dispenser output 182 and the go to clear block 224 until the cup is removed and the first infrared transmission 190 is not received 194. The top-off and cup flags are then cleared 180 and 181 and the system is again available for cup detection.

Figure 11:
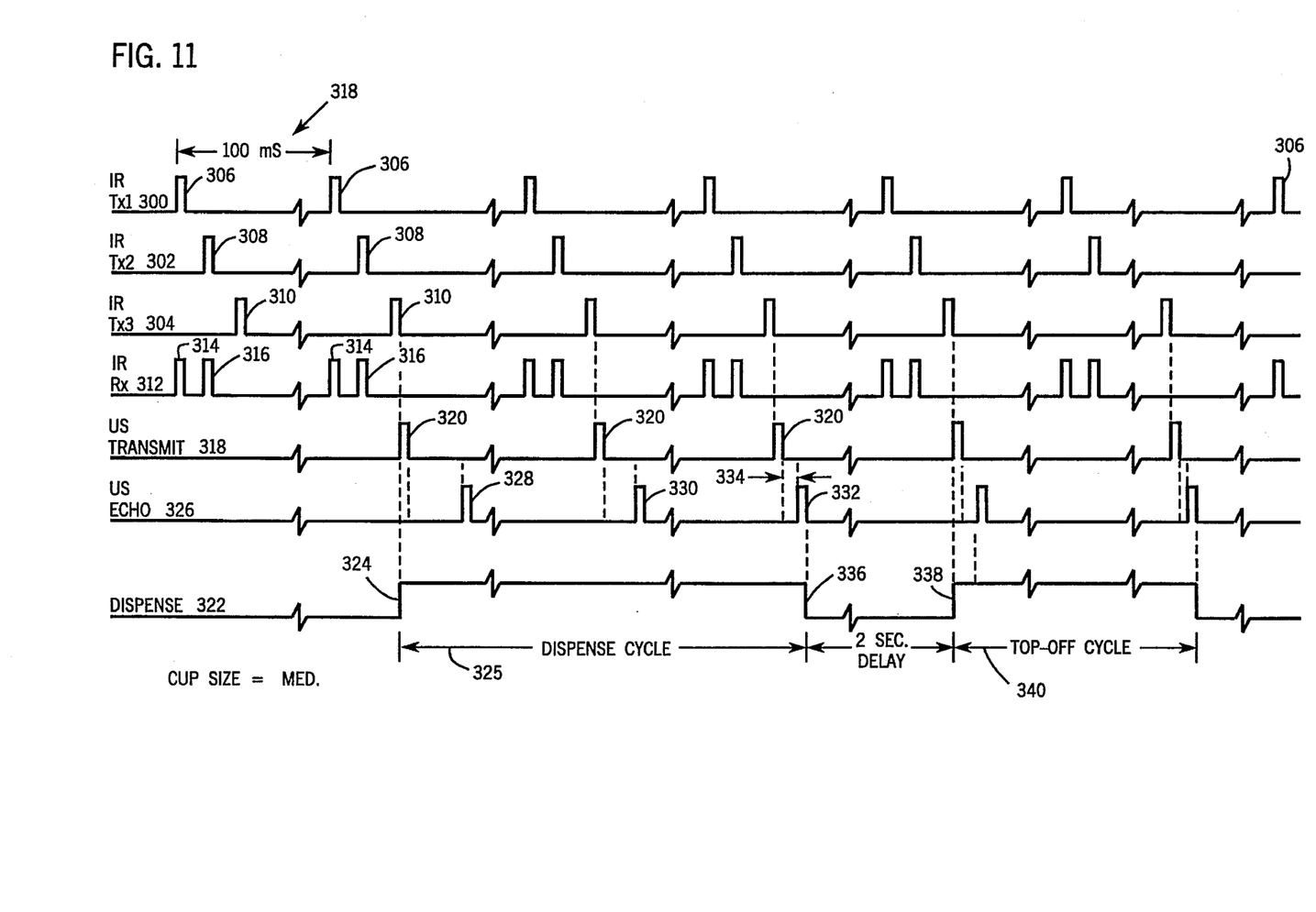
FIG. 11 is a timing diagram of a system in accordance with the present invention of FIG. 8.

FIG. 11 is a timing diagram for the present invention having an exemplary medium cup size. Time lines 300, 302, and 304 show sequential infrared transmissions 306, 308, and 310. Time line 312 shows reflected signal 314 from the first transmission 306, and reflected signal 316 from the second transmission 308. The absence of a third reflected signal on time line 312 from the third transmission 310 indicates a medium cup size as previously described. After a 100 ms. ON delay 318 and the continuous reoccurrence of reflected signals 314 and 316, the ultrasonic transmitter is activated 320 on time line 318 and the dispenser is activated 324 on time line 322 beginning the dispense cycle 325. Although the ultrasonic transmissions 320 on time line 318 are shown as a single pulse for clarity, in the preferred embodiment there are four short ultrasonic pulses occurring within the general time frame of this single pulse. However, the number of ultrasonic pulses emitted may be varied and depend to some extent on the precision desired, the distance to the object to be detected, and the operating environment.

Time line 326 shows the detection of reflected ultrasonic echoes 328 from ultrasonic transmissions 320. As shown, echoes 328, 330 and 332 become increasingly closer to transmissions 320 during dispense cycle 325 indicating the level in the cup is increasing and the time that an echo returns to the transceiver is shortened. When an echo is returned within a specified time of a transmission, as shown by echo 332 occurring within time 334 of an ultrasonic transmission 320, the level has reached the predetermined desired fill level and the dispense signal goes low 336 wherein the exemplary two second delay allows the product to stabilize. The two second delay is adjustable in the algorithm and depends upon the characteristics of the product dispensed. In the present application, a two second delay has been found to allow sufficient time for moderately carbonated beverages to stabilize. As previously described with reference to FIG. 10, once the dispense cycle and the delay are complete as shown by reference 338, FIG. 11, the top-off flag is incremented from zero to one and the top-off cycle 340 begins. The top-off cycle mirrors the dispense cycle in operation but is followed by the top-off flag being incremented from one to two.

Figure 12A:
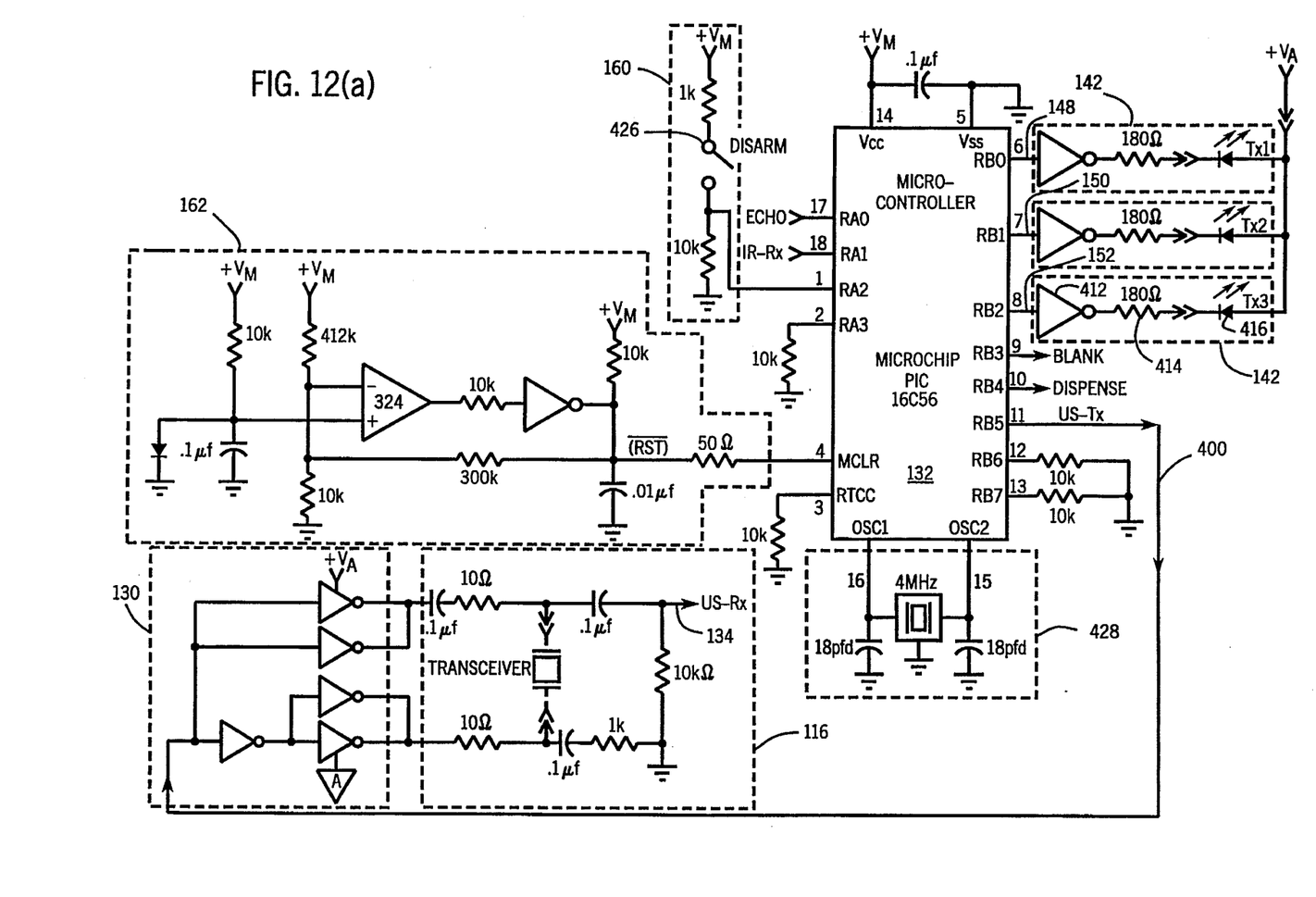
FIGS. 12(a)–(b) is a detailed circuit schematic of a system in accordance with the present invention of FIG. 8.
Figure 12B:
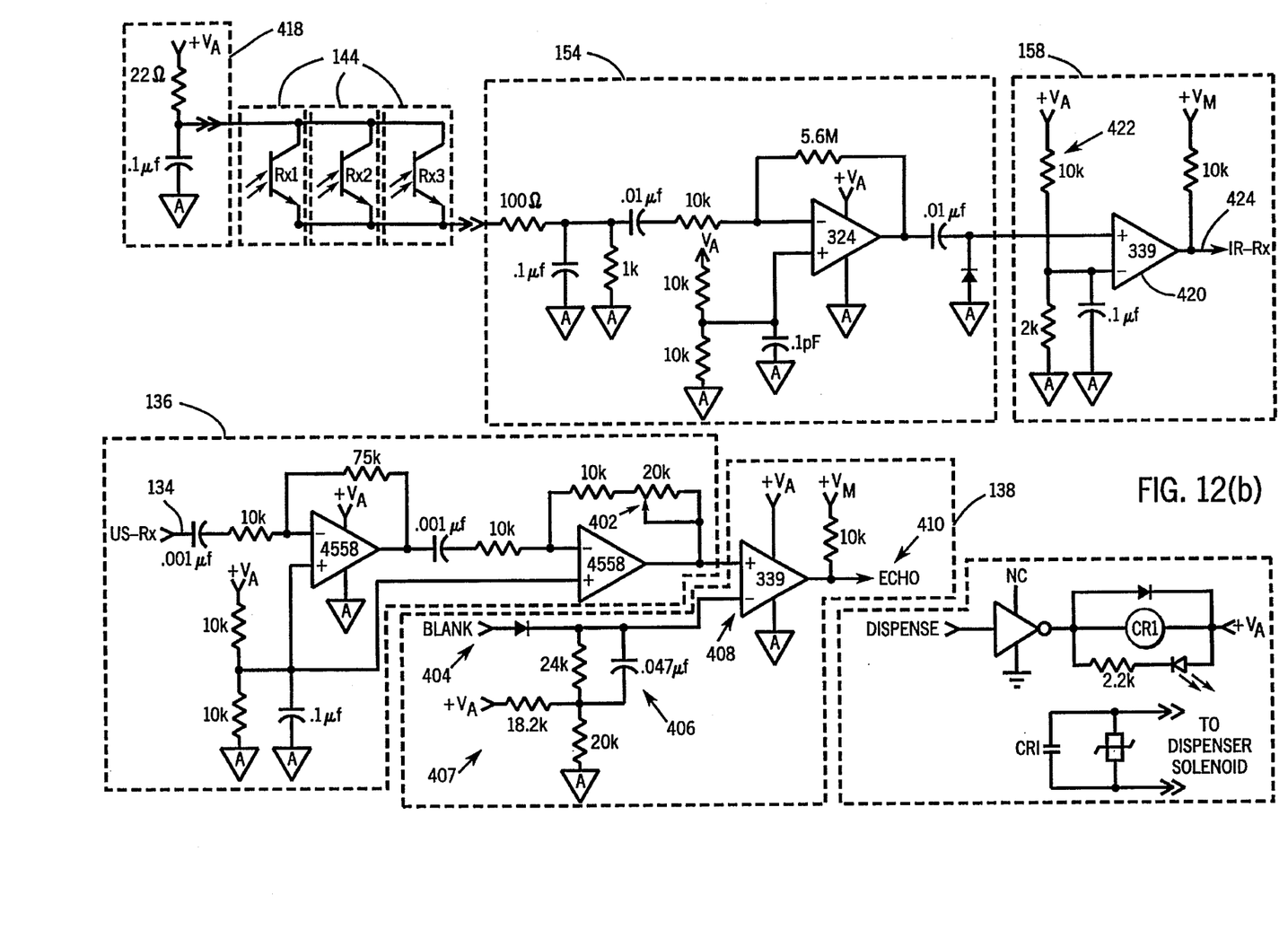

FIGS. 12(a)–(b) is a circuit schematic to implement the system as previously described. Common reference numbers are used to identify the blocks as described in FIG. 9. Microcontroller 132 provides an ultrasonic transmit signal 400, FIG. 12(a), to buffer/driver section 130 for driving an ultrasonic transceiver 116. Ultrasonic transceiver 116 produces level detection signal 134 to amplifier section 136, FIG. 12(b), which comprises a pair of amplifiers connected in a usual fashion but with potentiometer 402 to provide compensation for transceiver sensitivity. Amplifier section 136 is connected to level detector 138 which comprises a comparator 408 to compare the amplified signal to a predetermined parameter determined by a common voltage divider 407. The level detector includes a blanking input 404 from microcontroller 132 to disable the level detector during the transmission of an ultrasonic signal. Capacitor 406 and voltage divider 407 provide a ramped reference signal at the end of a blank signal that mirrors an ultrasonic transmission from transceiver 116 immediately enabling comparator 408 while eliminating sensing an errant echo from the transmission. Level detector 138 provides an echo signal 410 to microcontroller 132 at pin 17 when the amplified level detection signal is greater than the predetermined parameter of the voltage divider.

Microcontroller 132, FIG. 12(a), produces parallel IR inputs 148, 150, and 152 to transmitters 142 which comprise a driver 412, a resistor 414, and a light emitting diode 416. Receivers 144, FIG. 12(b), are connected to a common driver circuit 418 and to amplifier circuit 154 which in turn is connected to signal strength detector 158 comprising comparator 420 and voltage divider 422 and producing infrared received signal 424 to pin 18 of microcontroller 132, FIG. 10(a). Disarm circuit 160 comprises switch 426 and a pair of resistors as is commonly known. Reset circuit 162 provides a reset signal to maintain microcontroller 132 in a reset mode until full supply voltage is guaranteed. Oscillator 428 provides timing oscillations for microcontroller 132 and is also commonly known.

The present invention may also be implemented without the ultrasonic portion control if the microcontroller is programmed to dispense for a predetermined time based solely on the detected cup size. However, this implementation provides less accuracy.

Although the transmitter and receiver pairs 102 have been described as infrared transmitters and receivers because of a significant cost advantage, they may be replaced with ultrasonic transceivers as is disclosed in our U.S. patent application Ser. No. 08/284,004 filed Aug. 1, 1994, incorporated herein by reference. Further, ultrasonic transceiver 116 may be replaced with an infrared transmitter and receiver pair. However, inconsistency in dispensed product coloration would require constant and specific calibration to compensate for product color since infrared technology is highly color sensitive.

These and other equivalents, alternatives, and modifications are possible and within the scope of the appended claims.

We claim:

1. An automatic dispenser control to detect the presence of a container, determine a container size, and automatically dispense a product according to the detected container size comprising:

at least two transmitter and receiver pairs oriented in a plane such that a transmission from a selected transmitter converges with a line of sight from a corresponding receiver at a target intercept point;

a control circuit connected to each of the transmitter and receiver pairs for activating a selected transmitter and monitoring a corresponding receiver and producing a dispense signal when the corresponding receiver senses a reflected transmission from the selected transmitter indicating the presence of a container at the target intercept point;

a dispenser connected to the control circuit for dispensing a product into the container in response to receiving the dispense signal;

a transceiver mounted adjacent to the dispenser and producing a level detection signal; and wherein the control circuit receives the level detection signal from the transceiver and monitors a fill level of the product in the container in conjunction with activating and monitoring the transmitter and receiver pairs to determine continued container presence.

2. The automatic dispenser control of claim 1 wherein the control circuit comprises a microprocessor programmed to sequentially enable the transmitter and receiver pairs.

3. The automatic dispenser control of claim 2 wherein the microprocessor is programmed to assign a size to the container dependent upon which of the corresponding receivers sense a reflected transmission.

4. The automatic dispenser control of claim 2 wherein the microprocessor is programmed to assign a small size to the container when a first corresponding receiver senses a reflected transmission and a second corresponding receiver fails to sense a reflected transmission.

5. The automatic dispenser control of claim 2 wherein the microprocessor is programmed to assign a medium size to the container when first and second corresponding receivers sense a reflected transmission and a third corresponding receiver fails to sense a reflected transmission.

6. The automatic dispenser control of claim 2 wherein the microprocessor is programmed to assign a large size to the container when first, second and third corresponding receivers sense a reflected transmission.

7. The automatic dispenser control of claim 1 wherein the dispense signal produced by the control circuit comprises a predetermined parameter to effectuate dispensing based on which of the receivers senses the reflected transmission.

8. The automatic dispenser control of claim 7 wherein the predetermined parameter is a predetermined time period of the dispense signal that corresponds to a container size preassigned to each of the transmitter and receiver pairs such that dispensing is initiated long enough to fill the container.

9. The automatic dispenser control of claim 1 wherein the transmitter comprises a light emitting diode and the receiver comprises a photodiode.

10. The automatic dispenser control of claim 1 wherein the transmitter and receiver pairs are stacked vertically such that each transmitter and receiver pair corresponds to a particular container size.

11. The automatic dispenser control of claim 1 wherein the transceiver is an ultrasonic transceiver.

12. The automatic dispenser control of claim 1 further comprising a level detector connected to the transceiver and the control circuit.

13. The automatic dispenser control of claim 1 wherein the transceiver is mounted adjacent to the dispenser such that a signal emitted by the transceiver is reflected by a product dispensed into the container creating a reflected signal capable of detection by the transceiver.

14. The automatic dispenser control of claim 13 wherein the control circuit comprises an echo timer to record an echo time from a time a signal is emitted to a time when the reflected signal is detected.

15. The automatic dispenser control of claim 14 wherein the control circuit further comprises a converter to convert the echo time to a product level, and a decision checker to check whether the product level equals a predetermined desired fill level.

16. An automatic dispenser control comprising:

a plurality of transmitter and receiver pairs, each pair orientated in a plane such that a transmission from a selected transmitter converges with a line of sight from a corresponding receiver to form a target window;

a control circuit connected to each of the transmitter and receiver pairs wherein each transmitter is connected to the control circuit individually and the receivers are connected to the control circuit serially;

a dispenser connected to the control circuit; and a transceiver mounted adjacent to the dispenser and connected to the control circuit such that when a container is sensed in the target window by the transmitter and receiver pairs, the dispenser is activated to dispense a product into the container, and the transceiver monitors a fill level of the product in the container, and the dispenser is deactivated when the fill level reaches a desired level regardless of an amount of ice in the container.

17. The automatic dispenser control of claim 16 wherein each of the transmitter and receiver pairs comprise a light emitting diode and a photodiode.

18. The automatic dispenser control of claim 16 wherein the control circuit comprises a microprocessor.

19. The automatic dispenser control of claim 16 wherein the transceiver comprises an ultrasonic transmitter and receiver.

20. The automatic dispenser control of claim 16 further comprising a level detector connected between the transceiver and the control circuit and a signal strength detector connected between the transmitter and receiver pairs and the control circuit.

21. The automatic dispenser control of claim 16 further comprising a cup station located below the dispenser and wherein each of the transmitter and receiver pairs are stacked vertically in the cup station and the target intercept point is substantially centered in the cup station under the dispenser.

22. A method of automatically dispensing a product into a container comprising the steps of:

sensing the presence and absence of a container;

electronically determining a relative size of the container;

automatically dispensing product into the container;

sensing a product fill level in the container; and automatically discontinuing the dispensing of product into the container according to either the product fill level in the container or the absence of the container.

23. The method of claim 22 further comprising the steps of:

allowing the product in the container to stabilize; and automatically topping-off the product in the container.

24. The method of claim 22 wherein the step of electronically determining a relative size of the container is further defined to comprise the step of optically sensing the height of the container.

25. The method of claim 22 wherein the step of electronically determining a relative size of the container is further defined to comprise the steps of:

arranging multiple transmitter and receiver pairs vertically such that each transmitter and receiver pair corresponds to a particular container height;

arranging each transmitter and receiver of a transmitter and receiver pair in a plane such that a transmission from the transmitter converges with a line of sight from a corresponding receiver at a target intercept point defining the center of a target window;

sequentially enabling each transmitter and receiver pair such that a reflected transmission from a selected transmitter is sensed by a corresponding receiver when a container occupies a majority of the target window defined by the selected transmitter and the corresponding receiver; and assigning a relative size to the container based upon the last transmitter and receiver pair to sense a reflected transmission.

26. The method of claim 25 further comprising the steps of recognizing the absence of a reflected transmission from a transmitter and receiver pair following a sensed reflected transmission from a previously enabled transmitter and receiver pair, and assigning a relative size to the container based upon the last transmitter and receiver pair to sense a reflected transmission.

27. The method of claim 22 wherein the step of sensing a product fill level is further defined to comprise the steps of:

ultrasonically sensing a fill level by emitting pulses of ultrasonic waves into the container;

sensing reflected pulses of ultrasonic waves;

timing each pulse of ultrasonic wave from a time of emission to a time of reception; and converting the timing of each pulse of ultrasonic wave to a fill level in the container.

28. The method of claim 22 wherein the step of automatically discontinuing the dispensing of product is further defined to automatically discontinue the dispensing of product into the container when the container has been filled with a predetermined quantity of product determined in accordance with the relative size of the container.

29. A dispenser control to automatically fill a container with a product comprising:

a dispenser mounted atop a container station;

a transmitter and receiver pair to sense the presence of a container;

a transceiver mounted adjacent the dispenser; and a control circuit connected to the transceiver, the dispenser, and the transmitter and receiver pair and creating a dispense cycle to activate the dispenser in response to the transmitter and receiver pair sensing the presence of a container, the control circuit comprising a delay timer to interrupt the dispense cycle to allow a dispensed product to stabilize and subsequently creating a top-off cycle which reactivates the dispenser.

30. The dispenser control of claim 29 wherein the transceiver comprises an ultrasonic transmitter and receiver.

31. The dispenser control of claim 29 wherein the control circuit further comprises a microcontroller programmed to activate the dispenser and enable the transceiver to monitor a product fill level in the container such that when the product fill level reaches a desired fill level the dispenser is disabled and the delay timer is activated and after the delay timer expires, the top-off cycle is initiated activating the dispenser and the transceiver to monitor the product fill level such that when the product fill level again reaches the desired fill level, the dispenser is deactivated.

* * * * *